United States Patent Office 3,133,216
Patented May 12, 1964

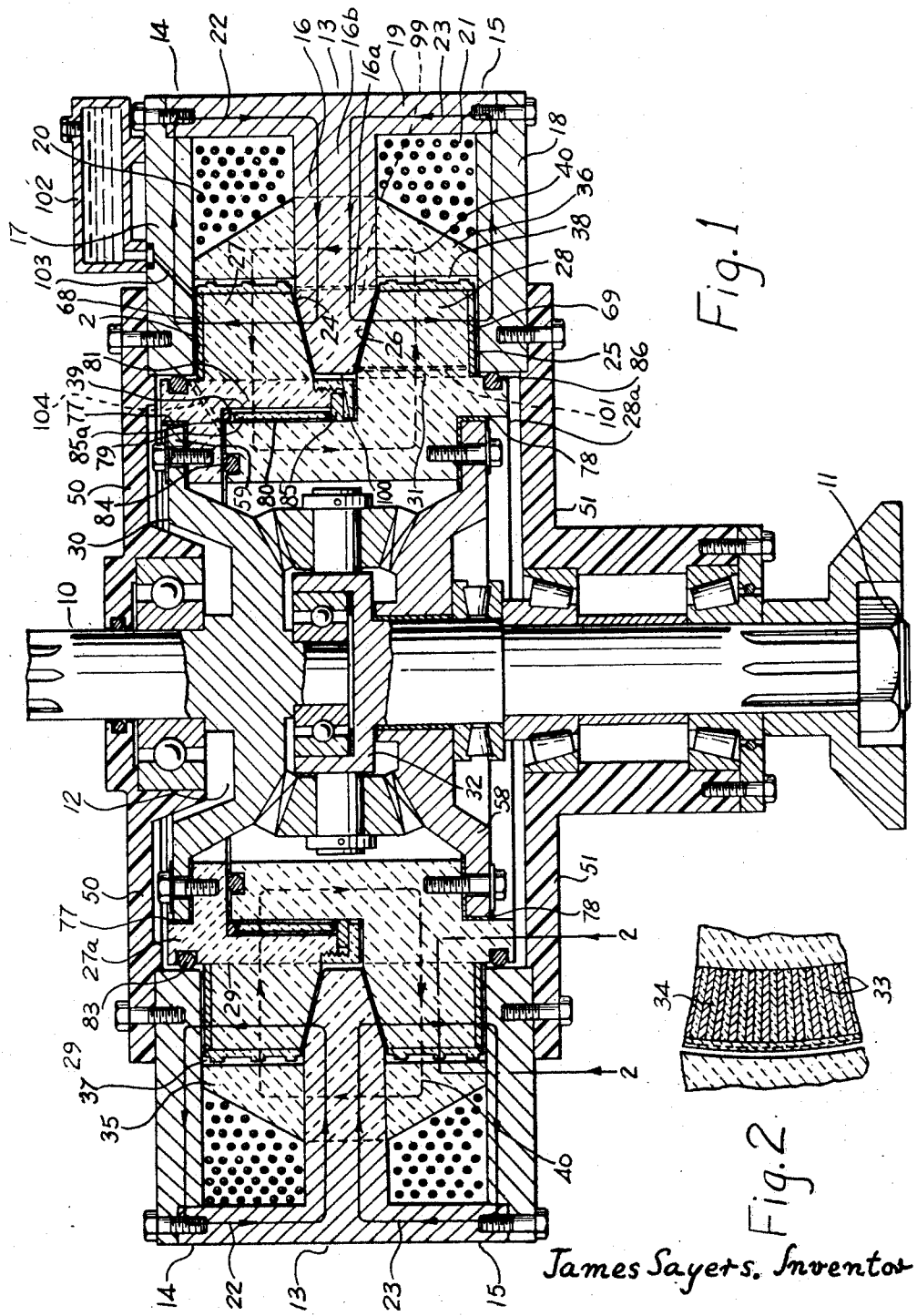

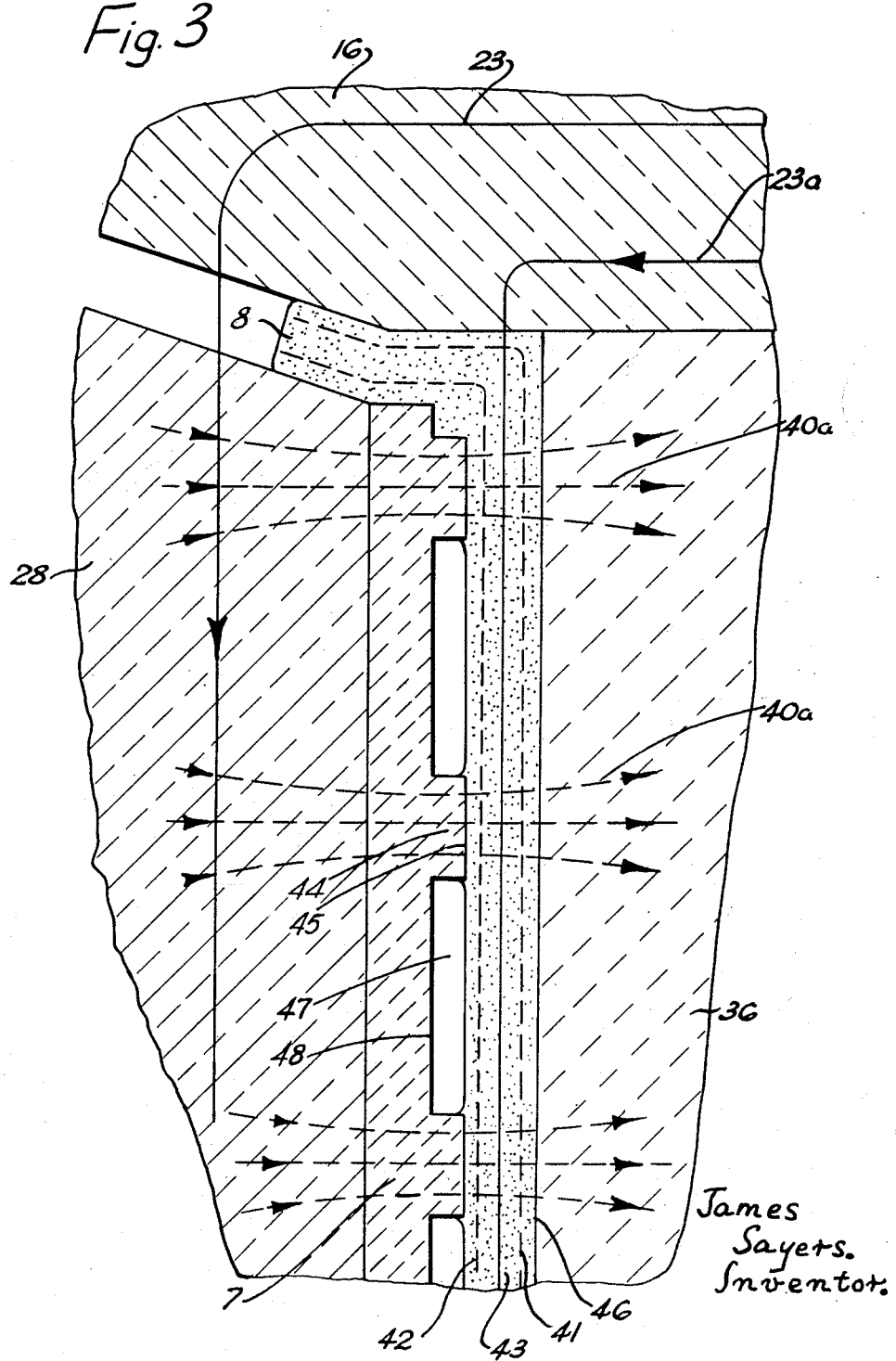

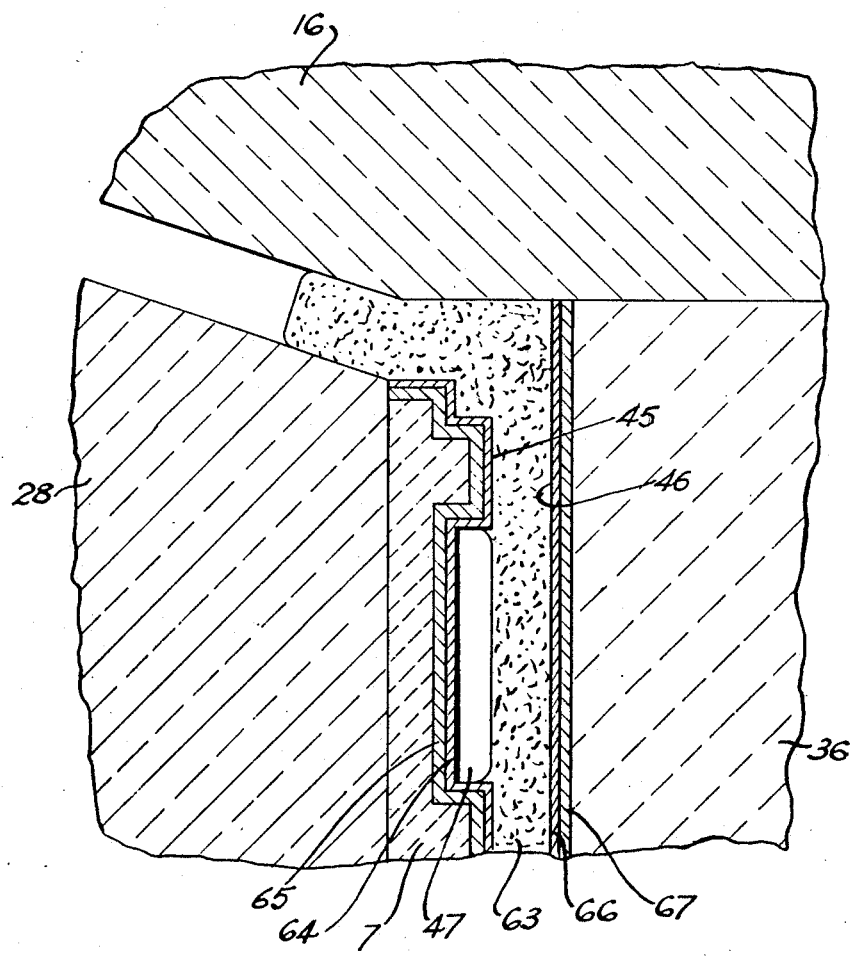

3,133,216
TRANSMISSION OF ELECTRIC CURRENT BETWEEN RELATIVELY MOVABLE CONDUCTOR MEMBERS
James Sayers, 25 Twatling Road, Barnt Green, England
Filed June 24, 1959, Ser. No. 822,483
Claims priority, application Great Britain July 3, 1958
6 Claims. (Cl. 310—232)

This invention relates to electrical brush devices of the kind wherein a quantity of electrically conductive liquid is maintained, during operation of the device in a gap between and in electrical contact with opposed adjacent current communicating faces of relatively movable conductor members, these faces being parallel to the direction of relative movement between the conductor members. Such brush devices are hereinafter referred to as being electrical liquid brush devices.

The electrically conductive liquid usually employed is mercury, although in suitable circumstances other liquids may be employed such, for example, as a sodium-potassium alloy or an alloy of mercury containing a small quantity of tin or copper.

In operation of an electrical liquid brush device the electrically conductive liquid necessarily partakes of the motion of one of the conductor members (the other being considered as fixed) at a position immediately adjacent to the current communicating face of the first said conductor member, so that, as considered in cross section in a plane perpendicular to the direction of relative movement, the liquid in the gap between the opposed current communicating faces of the conductor members may be considered as consisting of a plurality of laminae extending parallel to these faces and moving at different speeds, the lamina nearest the moving conductor member moving at the same speed as this conductor member, that nearest the conductor member considered as fixed being stationary, and intermediate laminae moving at speeds between zero and that at which the first mentioned lamina moves.

If however the speed of relative movement between the current communicating faces of the conductor members is raised above a certain limiting value (for a given thickness of gap between such current communicating faces) or if the thickness of the gap is increased beyond a certain limiting value (for a given speed of relative movement between the current communicating faces) the intermediate laminae will no longer undergo laminar flow but will pass into turbulent flow.

The change from totally laminar flow to partly turbulent flow is determined by the value of a quantity known as the "Reynolds number" which is given by the following expression:

Reynolds number $= d.V\rho/\eta$ where $d$ = thickness of gap (cms.).
$V$ = relative velocity (cms. per sec.).
$\rho$ = density of liquid (gm. per c.c.).
$\eta$ = viscosity of liquid (poises).

If for the particular case under consideration the Reynolds number is considerably more than 1500 there will be turbulent flow in the intermediate laminae. If the Reynolds number is less than 1000 the flow will be totally laminar.

The viscous or frictional drag on the current communicating faces in the case of totally laminar flow is directly proportional to the relative velocity, the viscosity of the liquid, and the area over which the liquid is in contact with directly opposed portions of the current communicating faces, and is inversely proportional to the thickness of the gap between these faces. If however flow in the intermediate laminae becomes turbulent, the effect of this is to reduce the effective thickness of the gap in which laminar flow takes place and thus increase the viscous or frictional drag. Above the velocity at which turbulent flow appears in the intermediate laminae the viscous or frictional drag becomes approximately proportional to the square of the velocity.

One object of the present invention is to reduce the viscous or frictional drag in an electrical liquid brush device.

In devices of the kind specified, the satisfactory operation of the device, or the length of time which the device can be maintained in a state of satisfactory operation, is impaired because there is difficulty in selecting the materials of which the solid and liquid conductor members are made, so that these will make effective electrical contact with each other and will not react physically or chemically in an adverse manner with each other.

The conductor member which is made of solid material is generally made of copper, whilst the conductor member of liquid form is generally constituted by a quantity of mercury. Copper and mercury however react to form an amalgam which, in the course of time, erodes the current communicating face of the conductor member which is made of copper. This reduces the life of devices such as electric switches of the kind previously mentioned, but is a more serious disadvantage in other forms of device such as electrical liquid brush devices especially where the current to be transmitted between the conductor members of solid form embodied therein is of high value for example of the order of 5000 amperes per square inch.

A further object of the invention is to avoid or reduce these difficulties by providing improved surface structure in the conductor members.

The term "wetted" as referred to herein means that when a quantity of the liquid occupying a smaller area than that afforded by the current communicating face of the conductor member is in contact with such face, the included angle defined between a line drawn in the plane of said face at the perimetrical boundary of the liquid and a tangent to the surface of the liquid at the point of intersection between the first said line and the said boundary is zero or nearly zero. In practice the angle concerned which is normally termed the "angle of contact" is such that in the margin adjacent to said boundary the thickness of the liquid layer reduces to molecular dimensions.

Wetting is advantageous in that firstly the capillary forces acting on the liquid tend to retain the liquid in position between the opposed current communicating faces of the conductor members of the brush device, and secondly in that wetting significantly reduces the contact resistance between the liquid and the solid conductor member with which it is in contact.

The invention will now be described by way of example with reference to the accompanying drawings wherein:

FIGURE 1 is a plan view in diametral cross section of one construction of transmission device embodying a duplex homopolar rotary electrical machine incorporating electrical liquid brush devices.

FIGURE 2 is a fragmentary view in end elevation and in cross section on the line 2—2 of FIGURE 1.

FIGURE 3 is a fragmentary view on an enlarged scale taken in plane and diametral cross section through a portion of one of the electrical liquid brush devices incorporated in the transmission device.

FIGURE 4 is a fragmentary view similar to FIGURE 3 on a still further enlarged scale showing the structure of the conductor members adjacent to their current communicating faces.

The employment of a duplex homopolar rotary electrical machine to constitute or form part of a transmission device forms the subject of my copending application Serial No. 822,607 now Patent No. 3,084,269 filed on the same date as the present application and entitled "Improvements relating to transmission devices" to which reference may be had for a detailed description and explanation as to the manner of working such device, but for convenience a summary of the main features of this transmission device is set forth herein in order that the role performed by the electrical liquid brush device with which the present invention is concerned may be fully comprehended.

The transmission device comprises a rotary input shaft 10 and a rotary output shaft 11 mounted for rotation coaxially with each other and operatively connected with each other in the particular construction illustrated through two couplings which are in effect in parallel with each other, such couplings being constituted by a differential gear indicated generally at 12 and a duplex homopolar electrical machine indicated generally at 13

The machine 13 comprises a homopolar input machine 14 (which normally acts as a generator) and a homopolar output machine 15 (which normally acts as a motor), these two machines having a magnetic field structure which includes a central annular pole piece 16 common to both machines, and outer annular pole pieces 17 and 18 forming parts of the machines 14 and 15 respectively, all these pole pieces being connected magnetically at their outer ends by a cylindrical yoke 19 which may be integral with the outer portion 16b of the common pole piece 16 if desired.

The machine 14 is provided with an excitation winding 20 accommodated in the outer part of the annular chamber afforded between the pole pieces 16 and 17 whilst a similar excitation winding 21 is accommodated in the like chamber between the pole pieces 16 and 18, these windings being connected each to a source of direct current by means of respective supply circuits not shown, which include means in at least one of such circuits for controlling the magnitude and direction of the direct current.

In a typical manner of operation the direct excitation currents flowing through the windings 20 and 21 may set up a magnetic flux in the two magnetic circuits afforded by the field parts of the two machines as shown in full lines at 22 and 23 respectively.

Each of the magnetic circuits includes a gap in the one case bounded by pole faces 2 and 24 and in the other case bounded by pole faces 25 and 26 and in these two gaps are disposed outer parts 27 and 28 of two armatures, these being an input armature 29 connected through the intermediary of one gear element 30 of the differential to the input shaft, and the other being an output armature 31 connected through the intermediary of a second element 58 and a third element 32 of the differential gear to the output shaft 11.

The pole faces 2 and 25 lie in planes perpendicular to the common axis of the shafts 10, 11 while the pole faces 24 and 26 are of frusto-conical form by virtue of the width of the inner portion of the pole piece 16 which reduces in an inward radial direction in conformity with the reduction in total flux which it is required to carry.

The armature parts 27 and 28 are each constructed to afford a magnetically conductive path between the pole faces forming the axial boundaries of their respective gaps and also to afford an electrically conductive path between the inner and outer circumferential boundaries of their respective gaps. The particular construction adopted in the example now described is illustrated more fully in FIGURE 2 and comprises laminations 33 of a suitable magnetically conductive material such as a low carbon steel and laminations 34 of a suitable electrically conductive material such as copper, which are interleaved with the laminations 33 so that preferably the laminations 33 occupy alternate positions with the laminations 34 intervening between them as will be apparent from FIGURE 2.

These laminations are disposed in radial planes passing through the axis of the shafts 10 and 11.

The laminations are preferably united with each other by fusion, e.g. welded, brazed or soldered together to form a rigid unit of high structural strength.

The inner portion 16a of the pole piece 16 is similarly formed of like interleaved laminations united together by fusion.

The inner portions 27a and 28a of the armatures 29 and 31 may be formed wholly of electrically conductive material such as copper. This is indicated in FIGURE 1 by broken line shading whereas the laminated parts 27, 28 are shown in shading consisting of alternate full and broken lines. Portions of the field structure (formed wholly of magnetically conductive material such as low carbon steel are shaded wholly in full lines).

To reduce the generation of eddy currents in the surface layers of armature parts 27, 28 opposed to the pole faces 2 and 25, the armature parts at these positions are provided with iron face pieces 68, 69.

Similar face pieces are not provided on faces of the armature parts opposed to the pole faces 24 and 26 of the inner pole face since this would set up an undesirable magnetic short circuit interlinked with the main current path as hereinafter referred to.

This feature of the construction forms the subject of my copending application Serial No. 822,607, Patent No. 3,084,269, filed on the same date as the present application and entitled "Improvements relating to homopolar electrical machines," to which reference may be had for a fuller description.

Assuming that the shaft 10 is driven so that the armature 29 and the part thereof 27 disposed between the pole faces 22 and 24 rotates an induced voltage will be set up between the inner and outer ends of the laminations 34 which are all in parallel with each other and subject to the completion of a circuit through these laminations a current will flow.

A closed circuit is in fact completed through the laminations 34 of the armature part 27 by means of outer conductor members 35 and 36 constituted by integral extensions of the copper laminations of the inner portion 16a of the central pole piece 16, through the laminations 34 of the other armature part 28 and the inner parts 28a and 27a of the armatures 31 and 29. Components of this circuit which are movable relatively to each other namely, the armature part 27 and the outer conductor member 35; as well as the armature part 28 and outer conductor member 36; and also the inner parts 27a and 28a of the input and output armatures 29 and 31; are connected electrically together through the intermediary of an electrically conductive liquid which in combination with the portions of these members in contact with such liquid constitutes an electrical liquid brush device. The liquid utilised may be mercury and is indicated at 37, 38 and 39 for the three electrical liquid brush devices thus constituted.

The path along which the current flows in a closed circuit is indicated by the broken line 40 and it will be observed that this interlinks both magnetic fluxes 22 and 23 so that by adjusting the relative magnitudes and directions of these latter the ratio of torque to speed obtaining in the case of the armature part 28 can be varied relatively to that obtaining in the case of the armature part 27, thus enabling a corresponding transformation of speed to torque ratio to be effected as between the input and output shafts 10 and 11 in any of a number of ways as more fully described in my previously mentioned copending application Serial No. 822,607, Patent No. 3,084,269.

Referring now specifically to FIGURE 3 which illustrates on a larger scale a portion of the electrical liquid brush device by means of which current is conveyed from the armature part 28 to the outer conductor member 36, it will be apparent that the outer conductor member 36 is normally stationary so that the lamina of mercury 41 immediately adjacent thereto in the gap between the opposed circumferential faces of the member 36 and the armature part 28 will also tend to be stationary whilst the lamina 42 of mercury immediately adjacent to the current communicating face of the armature part 28 will tend to rotate at the same speed.

For the sake of clarity in the drawing the thickness in these laminae has been deliberately exaggerated.

In between the two laminae 41 and 42 are a series of intermediate laminae 43 which move circumferentially at speeds between zero and the circumferential speed of the lamina 42, ideally such flow being laminar flow, that is to say, taking place in cylindrical planes concentric with the axis of rotation.

In practice, this condition is dependent upon the circumferential speed of the current communicating face of the armature part 28 being maintained below a limiting value (for a given thickness of gap measured radially between the current communicating faces of the armature part 28 and the outer conductor member 36) and if such limiting speed is exceeded, flow of mercury in the intermediate laminae 43 becomes turbulent, that is to say, it takes place inter alia in directions radial or transverse to the ideal cylindrical planes of flow in a complex manner. This reduces the effective radial thickness in which laminar flow is maintained and since drag increases with any reduction in this dimension the drag is thus consequently increased.

Any one or each of three expedients is adapted to reduce frictional drag, these being firstly to reduce the area of the relatively moving current communicating faces connected by the liquid, secondly to suppress turbulent flow in the intermediate laminae, and thirdly to sub-divide the gap radially whereby the relative circumferential velocity which gives rise to the drag is reduced.

The first of these expedients is the formation on one of the current communicating faces at least, preferably the face afforded by a continuous annular member 7 connected electrically to the laminations 34 of the armature part 28 of a plurality of ribs 44, the outer circumferential faces 45 of which then collectively constitute the current communicating face of the armature part 28.

Typically when mercury is used as the electrically conductive liquid the radial dimension of this gap may be approximately 0.005 of an inch for a circumferential speed of the faces 45 of 140 ft. per second or thereabouts.

The spaces between the ribs 44 which may be in the form of grooves 47 do not tend to become filled with the electrically conductive liquid because this is subjected to centrifugal forces tending to maintain it in circumferential flow of maximum path diameter (in fact determined by the diameter of the current communicating face 46). It is in fact, not difficult to so adjust the pressure conditions obtaining in those parts of the liquid opposite the grooves 47 to ensure that the liquid does not penetrate into the grooves or does so only to a slight extent, as illustrated in FIGURE 3.

This may be contrived by providing a reservoir portion 8 of liquid in the gap between the axial boundary of the conductor member 7 and the opposed pole faces such as the pole face 26. Liquid in this reservoir portion will tend to be expelled radially and will thus exert a "hydrostatic" pressure at the ends of the cylindrical shell of liquid occupying the gap between the current communicating faces of the conductor member 7 and the conductor member 36, so that by controlling the quantity of liquid present in the reservoir portion 8 the magnitude of the "hydrostatic" pressure can be controlled and this can be made to set up balance with the centrifugal forces acting on the liquid opposite the grooves 47 so as to prevent any extensive penetration of the liquid into these grooves.

Because there is no contact between the liquid which is disposed opposite to the grooves 47 and the bases or inner circumferential faces 48 of these grooves themselves, liquid contained in the lamina 42 opposite to the grooves 47 is not constrained by contact with the conductor member 7 and does not therefore exert significant drag thereon, so that the drag is confined to that proportion of the liquid in contact with the faces 45 and the total drag is reduced by a factor approximating to the ratio of the area afforded by the faces 45 to the total area afforded by the faces 45 and 48 together.

Also, because the radial thickness of liquid opposite to the grooves 47 is equal to or only slightly greater than the thickness of liquid between the faces 45 and 46, and because the liquid in the lamina 42 opposite the grooves 47 is not constrained to move at the same circumferential speed as the faces 45, turbulent flow is also avoided or the risk of it being set up is reduced in those portions of the intermediate laminae 43 opposite the grooves.

The lateral concentration or crowding together of the current in the conductor members 7 and 36 (typically) which results from the reduction in the effective width of the current communicating face of the member 7 would tend to reduce the efficiency by increasing the electrical resistance of the current path, were this lateral concentration or crowding confined to a single rib (or produced merely by a reduction in the widths of the current communicating faces of the conductor members).

By utilising a plurality of ribs spaced apart laterally, the increase in electrical resistance is much less pronounced and may be negligible because of lateral spreading out of the current as indicated by the broken line arrows 40a from the bases of the ribs (and from the annular areas of the other conductor member opposed thereto) so that within a very small radial distance the lateral current distribution in each of these members becomes nearly uniform. The loss of efficiency through such slight increase in electrical resistance as occurs is significantly exceeded by the gain in efficiency due to reduction in frictional drag.

For optimum efficiency it is believed that the sum of the axial widths of the ribs should be about one-half to one-tenth of the total width of the conductor member on which they are present, a preferred value being about one-fifth.

The height of each rib may typically be about one-third of the axial width. The ribs may be spaced apart laterally uniformly across the width of the conductor member, the extreme lateral ribs being somewhat inset from the lateral boundaries.

If desired, the current communicating faces 45 and 46 could themselves be shaped to include local formations of small depth which would promote axial flow of the liquid, for example, in opposite directions in the laminae 41 and 42 respectively so that an axially extending circular is set up whereby there is a migration of liquid from positions at which the current carrying duty is at or near a maximum to positions at which the current carrying duty is at or near a minimum.

Referring now to the second expedient, this comprises the setting up of a magnetic field extending in a direction parallel to the plane in which laminar flow is required to be maintained, i.e. parallel to the planes of the opposed current communicating faces 45 and 46 and traversing the gap between these faces in a direction perpendicular to the relative movement between them. This field may be set up by the same pole pieces as are utilised to set up the magnetic field in which the armature parts operate, a portion of the magnetic flux as indicated diagrammatically by the arrow 23a "leaking" through the electrically conductive liquid.

It will be observed that in fact the direction of the leakage flux 23a is perpendicular to both the direction of current flow through the liquid and to the direction of relative movement between the face 45 of the conductor member 7 and the face 46 of the outer conductor member 36.

In practice, the leakage flux 23a would probably not be in a strictly cylindrical plane as theoretically desired, and thus the general configuration of the generatrixes which define the current communicating faces of the conductor members (in this case 7 and 36) could be shaped so as to be parallel or nearly parallel with the actual leakage flux path in the gap.

The existence of any appreciable fringing or leakage flux extending radially and axially inwards from the stator portion 16 to the armature parts 27, 28 and from the stator portions 17 and 18 to these armature parts across the corners of the armature parts where their circumferential and axial faces meet is avoided by making the conductor member 7 of a substantial thickness, e.g. $\frac{1}{16}$ to $\frac{1}{8}$ of an inch. This imposes a high reluctance barrier in the path of any such fringing or leakage flux tending to cross the gap between the current communicating faces of the conductor members bordering thereon. If such fringe or leakage flux existed in this direction it would tend to set up electrical eddy currents in the mercury and in the conductor members such as 7 themselves with resulting loss and heat generation.

Axial displacement of the liquid in the gap between the current communicating faces bodily from one lateral boundary of the gap towards the other in consequence of forces set up electro-magnetically in the liquid itself may be counteracted by providing a somewhat greater quantity of liquid in one of the reservoir portions at one lateral boundary than is the case at the other, so that there is a resultant hydrostatic pressure exerted axially in the gap. Retention of the liquid in the gap is also assisted by capillary forces set up between the current communicating faces 45 and 46. The capillary forces are exerted on the liquid at the axial boundaries of each rib and thus the total retention force set up is proportional to the number of ribs.

A mercury equalising duct 99 may be drilled through the pole piece 16 at a position inset radially by a short distance, typically $\frac{1}{8}$ of an inch, from the inner current communicating face 45, so that it is not possible for all the mercury to accumulate in one or the other of the two brush devices connected by such duct.

Should any tendency to develop turbulent flow occur in the intermediate laminae 43 such turbulent flow will necessarily involve movement of liquid in a direction intersecting with the leakage flux 23a and consequently induced currents would be set up in the liquid producing electro-magnetic forces in the liquid opposing the movement initiating the induced current.

In the case of the liquid brush device operative between the inner parts 27a and 28a of the input and output armatures 29 and 31 respectively, the third expedient for reducing frictional drag is employed.

This expedient consists in providing a shell 79 of ring-like form between the current communicating faces 80 and 81 of the inner parts of the output and input armatures respectively.

The shell 79 is of circular form in cross section perpendicular to the axis of rotation of the armature and has inner and outer circumferential faces which in longitudinal cross section are parallel to the opposed current communicating faces 80 and 81, being, in the particular example illustrated, of cylindrical form.

The shell 79 which may be made of copper and protected against any attack by mercury by the provision of a barrier layer for example of nickel the exposed surface of which is provided with a wetting layer or otherwise treated to promote wetting of the shell. The shell is freely rotatable in the gap between the two current communicating faces and will, during operation of the device, rotate at an angular velocity intermediate the angular velocities of the input and output armatures. In practice the shell 79 will normally rotate relatively to the outer current communicating face 81 at a peripheral speed which is half that of the current communicating face 81 relatively to the current communicating face 80.

The viscous or frictional drag exerted on the input armature 29 is thus reduced (by a factor of 4 for a Reynolds number greater than that at which laminar flow is maintained).

It will be evident that if desired the gap between the current communicating faces could be subdivided radially by the provision of a series of shells such as 79 disposed one within the other, in which case the viscous or frictional drag would be still further reduced (under the conditions mentioned by a factor equal to the square of the number of subordinate gaps produced by the radial sub-division).

Preferably and as illustrated, the radial distance between the inner face of the shell 79 and the current communicating face 80 is made less than the radial distance between the outer face of the shell and the current communicating face 81. This prevents the shell ever coming into contact with both armatures simultaneously.

If a series of shells were provided one within the other, these would preferably be made of very small radial thickness, for example about 0.1 inch and provision would be made to maintain total immersion of the shells at all times so as to avoid rubbing contact between the shells being set up in the initial stages of relative movement between the conductor members of the brushes in which the shells are incorporated.

At the ends of the gap within which the shell 79 is situated stop members are provided to prevent displacement of the shell in its own plane, i.e. axially. One of these stop members 85 also forms a seal for the mercury. The other one 85a has a clearance with respect to the inner of the two armature faces. Both stop members are preferably made of a material which has a low coefficient friction with respect to that of the shell 79. Only one of them however takes the normal outward axial thrust of the shell due to the magnetic field set up by toroidal current 40.

It will be appreciated that since the gap within which the shell is disposed is inset radially be an appreciable distance from the main working magnetic fluxes 22, 23 and is separated from the laminated armature parts which are composed wholly of copper, there will be no risk of any flux of appreciable magnitude traversing the gap between the opposed current communicating faces so that the risk of generating electrical eddy currents in the mercury or the shell 79 is substantially eliminated.

It will, of course, be understood that if desired the first expedient previously referred to, namely the provision of ribs on one of the current communicating faces may be adopted in this brush device, as may also the second expedient of providing a magnetic flux traversing the gap in the direction of its width.

Mercury is retained in the several liquid electrical brush devices illustrated by means of sealing rings 83 to 86.

The space 100 communicates through a vent duct 101 with the gap between the armature 31 and the pole face 25 so as to prevent pressure variations in the space 100 producing unwanted displacement of the mercury in the two outer brush devices. If desired a similar vent duct could be provided between the space 100 and the gap between the pole face 2 and the armature 27.

Whilst it is contemplated that mercury or an alloy of mercury with a small quantity of copper or tin will, in general, be the most suitable to employ in the transmission device now described and also in homopolar rotary electrical machines which may be used as generators or as motors, it will be understood that both expedients referred to and described specifically herein can be utilised for other electrically conductive liquids such as that previously mentioned.

The foregoing description in detail is applicable to the electrical liquid brush device operative between both armature parts and the outer conductor members 35 and 36 respectively.

In the case of this brush device the circumferential speed of the current communicating face afforded by the ribs will be somewhat less than that obtaining in the case of the brush devices operative between the armature parts 27 and 28 and their respective outer conductor members 35 and 36 and for this reason it may not be necessary to utilise the second expedient namely, the setting up of a magnetic field such as that represented by the leakage flux 23a in FIGURE 3. If however, such a field were desired, it could be set up by extending pole pieces to positions adjacent to the lateral boundaries of the gap between the inner part of the output armature 31 and the input armature 29 and providing a suitable excitation for such pole pieces, the output armature 31 incorporating an axially extending groove or recess or being otherwise shaped to permit of the pole piece adjacent thereto projecting sufficiently closely to the lateral boundary of the gap concerned.

The face presented radially outwards of the armature part which is exposed to contact with the mercury 63 is constituted by an outermost layer 64 of copper beneath which is an inner or barrier layer 65 of nickel the function of which is to act as a barrier preventing the mercury from contacting the conductor member 77. Two similar layers 66 and 67 respectively are incorporated at the inwardly presented face of the conductor member 36.

The thickness of both layers as seen in FIGURE 4 has been deliberately exaggerated for the sake of clarity.

Both layers may be deposited on the conductor member to which they pertain by a plating process and the wetting layer 64 subsequently becomes reduced in thickness by amalgamation with the mercury 63 so that finally it is only of just sufficient thickness to enable contact to be made between the mercury and the conductor member over a surface which is wetted. A very thin wetting layer 64 of copper will serve this purpose and such layer may be of molecular thickness.

The same considerations apply to the wetting and barrier layers 66 and 67 of the conductor member 36.

It will be observed that the wetting and barrier layers are in the case of the armature part 28 continued over the axially presented faces and the base of each slot 47 intervening between adjacent ribs 44 of the armature part so that should the mercury 63 temporarily be brought into contact with these faces or the base of the slot as for example when the armature part 28 is stationary, there will be no physical contact between the copper incorporated in the armature part 28 (except the wetting layer 64) and the mercury 63.

The thickness of the barrier layers 65 and 67 of nickel may typically be 0.001 inch. This is not critical but if the barrier layer of nickel has some slightly porosity its thickness should be sufficient to prevent effective contact between the mercury and the underlying copper of the armature part or conductor member concerned.

It will of course be understood that other electrically conductive metals may be employed in substitution for nickel, to form the barrier layer, such metals being selected for their ability to withstand physical or chemical attack by the mercury.

A metal which may be employed for the barrier layer as a substitute for nickel is iron.

Similarly other suitable metals may be employed in substitution for copper to form the wetting layer provided, such metals are wetted when brought into contact with mercury these metals also being electrically conductive.

Instead of using a wetting layer of copper or other metal as referred to the exposed surface of the barrier layer may be treated with a flux or etching agent which promotes wetting of the surface by mercury or an alloy thereof previously referred to. One such flux which may be employed is zinc chloride. An etching agent which may be used is nitric acid.

In cases where it is desired to maintain continuous immersion or covering for current communicating faces (except spaces between the ribs when the apparatus is operating) a mercury tank or receiver 102 may be provided at any suitable position, preferably externally of the stator. This tank or receiver 102 communicates by way of a duct 103 with the mercury space between the opposed current communicating faces.

The inner brush device between the two armature parts would be fed with mercury through the duct 104.

The exposed edge faces of the laminations of the stator portion 16a and of the armature portions 26 and 27 are also plated with the barrier layer metal, e.g. nickel. This protects the copper laminations.

The end members 50 and 51 of the transmission device are made of non-magnetic material to avoid any short circuiting or leakage of the desired magnetic flux passing between opposed pole faces 2 and 24, and 25 and 26.

Further, annular members 77, 78 of L-shape in cross section and of electrically insulating material are interposed respectively between the parts 30 and 27a and the parts 58 and 28a to avoid setting up an electrical current path in parallel with the laminations 34 (as between their inner and outer radial boundaries) embodied in the armature parts 27 and 28.

What I claim then is:

1. An electrical liquid brush device comprising inner and outer concentric conductor members of which at least the inner member is rotatable to produce relative rotation between them, said members having respective current communicating faces presented radially outwardly and radially inwardly and defining a gap therebetween, a quantity of electrically conductive liquid in said gap, said inner conductor member including at its current communicating face a plurality of ribs extending circumferentially thereof and having outer faces presented in opposed generally parallel spaced relation to said current communicating face of said outer conductor member, said ribs themselves being spaced apart from each other in a direction cross-wise of said direction of relative movement to define channel-like spaces between said ribs from which said liquid is excluded centrifugally in operation of said device said ribs collectively affording a width approximating to one-fifth of the total width of the current communicating face of the inner conductor member.

2. An electrical liquid brush device comprising relatively rotatable conductor members having opposed current communicating faces defining a gap therebetween and extending continuously in a direction circumferentially of the gap to form and define continuous boundaries therefor, a quantity of electrically conductive liquid in said gap, at least one rotatable conductor shell disposed in said gap and sub-dividing same in the direction of its thickness, said shell being adapted to rotate in operation of said device in contact with said liquid and at a speed relatively to each of said conductor members lower than that obtaining as between said conductor members, and means for positionally controlling said shell in its own plane.

3. An electrical liquid brush device comprising inner and outer concentric conductor members rotatable relatively to each other and having respective current communicating faces presented radially outwardly and radially inwardly both said faces being continuous circumferentially of said members and defining a gap therebetween, a quantity of electrically conductive liquid in said gap, at least one rotatable conductor shell disposed in said gap and sub-dividing same in the direction of its thickness, said shell being adapted to rotate in operation of said device in contact with said liquid but in spaced relation to each of said current communicating faces, and at a speed relatively to each of said conductor members lower than that obtaining as between said conductor members, and stop means at one end at least of said gap to prevent axial displacement of said shell therefrom.

4. An electrical liquid brush device comprising inner and outer concentric conductor members rotatable relatively to each other and having respective current communicating faces presented radially outwardly and radially inwardly, both said faces being continuous circumferentially of said members and defining a gap therebetween, a quantity of electrically conductive liquid in said gap, at least one rotatable conductor shell disposed in said gap and sub-dividing same in the direction of its thickness, said shell being adapted to rotate in operation of said device in contact with said liquid but in spaced relation to each of said current communicating faces, and at a speed relatively to each of said conductor members lower than that obtaining as between said conductor members and a stop member of a material having a low coefficient of friction in relation to the material of which said shell is formed and disposed at one end at least of said gap to prevent axial displacement of said shell therefrom.

5. An electrical liquid brush device comprising relatively movable conductor members having opposed current communicating faces defining a gap therebetween and extending in a direction parallel to the direction of relative movement, a quantity of electrically conductive liquid in said gap, said conductor members including at their current communicating faces, an inner layer of electrically conductive material resistant to physical and chemical erosion by said liquid, and an outer wetting layer overlying said inner layer and formed of an electrically conductive material which is readily wetted by said liquid.

6. An electrical liquid brush device comprising relatively movable conductor members having opposed current communicating faces defining a gap therebetween and extending in a direction parallel to the direction of relative movement, a quantity of electrically conductive liquid including at least some mercury in said gap, said conductor members including at their current communicating faces, an inner layer of electrically conductive material resistant to physical and chemical erosion by said liquid, and an outer wetting layer of copper overlying said inner layer said wetting layer being of substantially smaller thickness than said inner layer.

References Cited in the file of this patent
UNITED STATES PATENTS

| | | |
|---|---|---|
| 1,001,047 | Kleinsmidt | Apr. 22, 1911 |
| 1,635,319 | Gill | July 12, 1927 |
| 2,588,466 | Barnes | Mar. 11, 1952 |
| 2,753,476 | Watt | July 3, 1956 |
| 2,828,431 | Klaudy | Mar. 25, 1958 |

FOREIGN PATENTS

| | | |
|---|---|---|
| 846,920 | France | June 19, 1939 |